Figure 1:
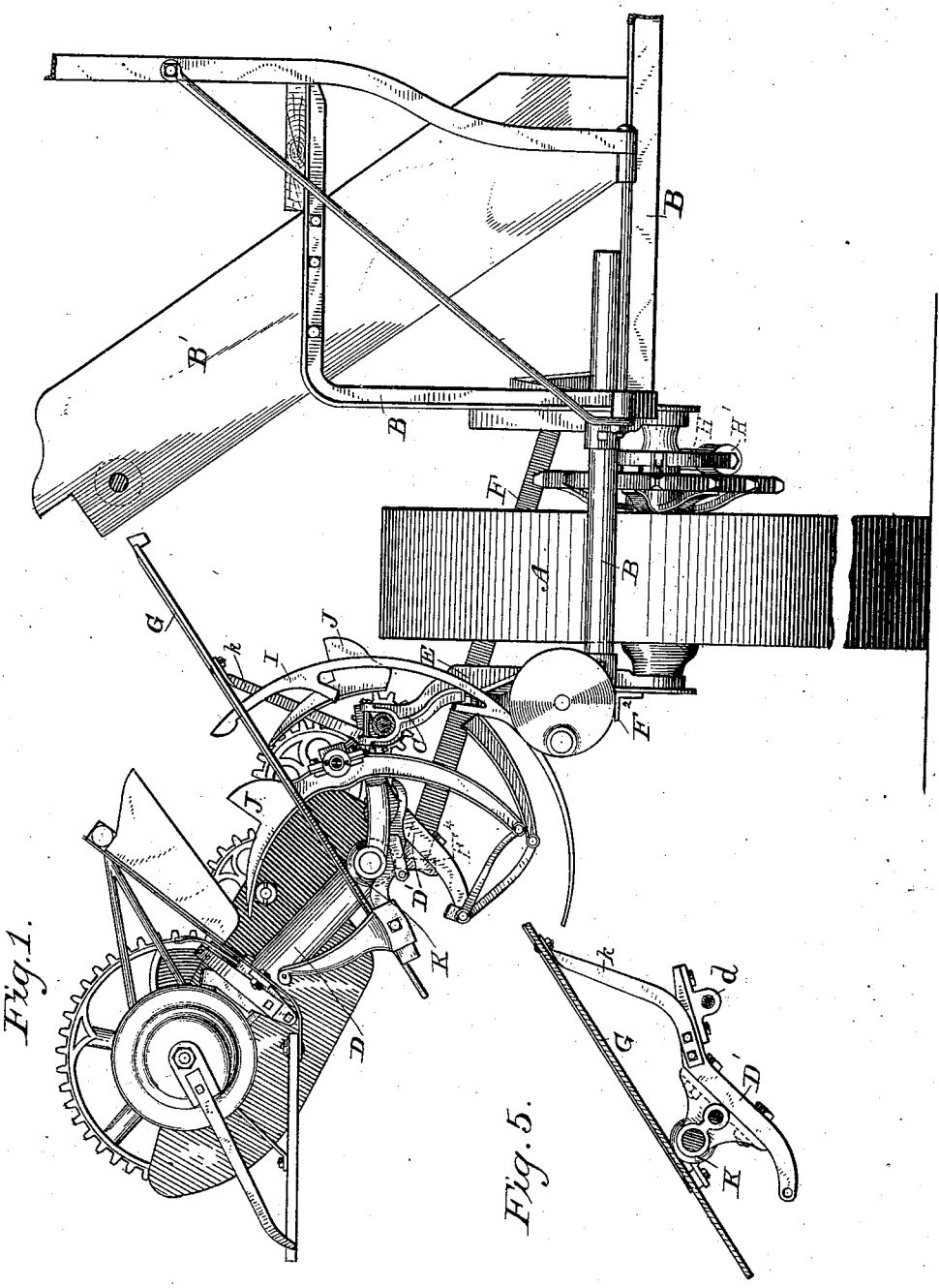

(No Model.) 5 Sheets—Sheet 2.

J. E. DEERING & J. F. STEWARD.
SELF BINDING HARVESTER.

No. 509,020. Patented Nov. 21, 1893.

Witnesses.
Arthur Johnson
Laurence N. Bealing

Inventors
James E. Deering
John F. Steward (No Model.) 5 Sheets—Sheet 3.
J. E. DEERING & J. F. STEWARD.
SELF BINDING HARVESTER.
No. 509,020. Patented Nov. 21, 1893.
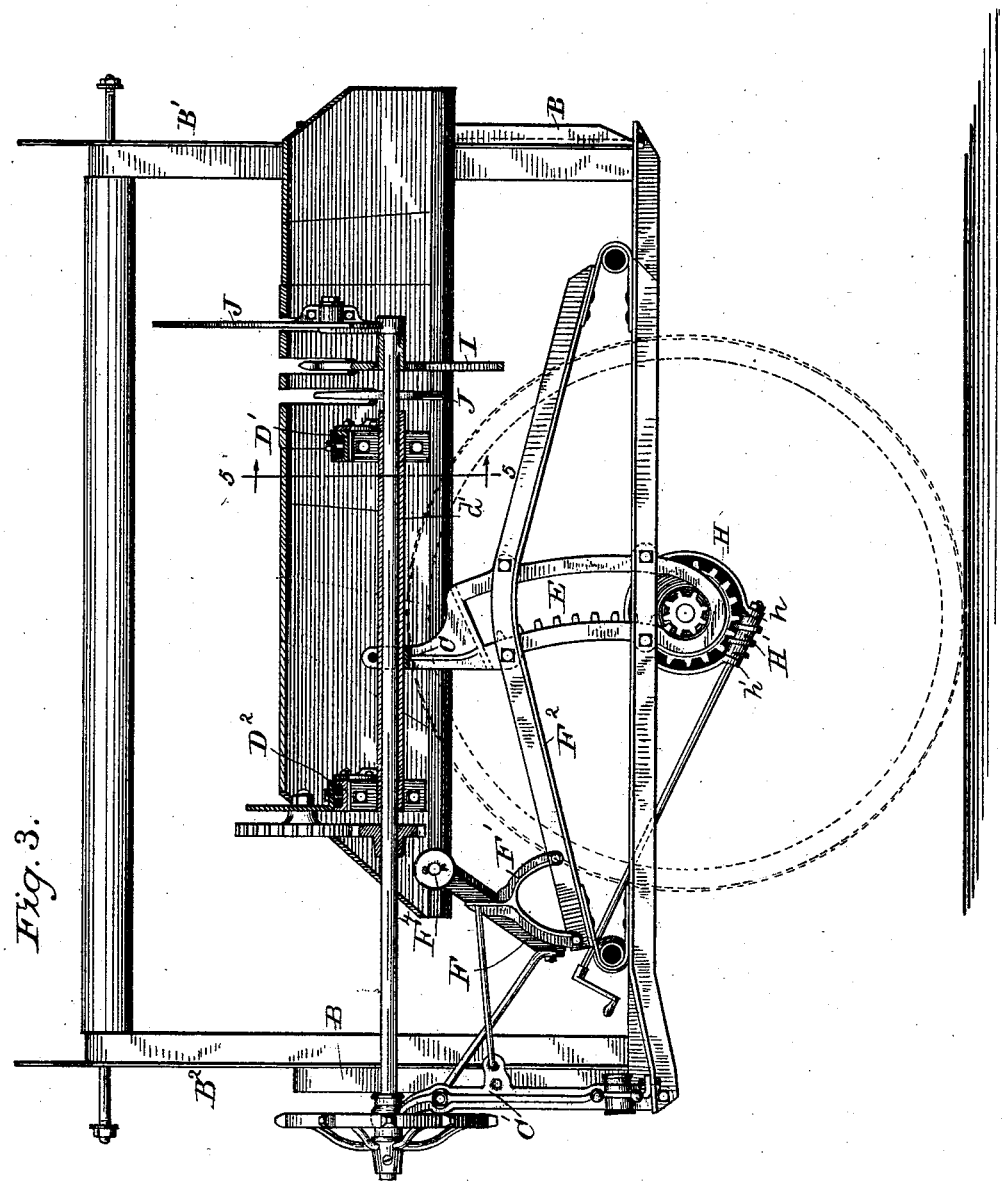
Witnesses.
Inventors (No Model.)   5 Sheets—Sheet 4.
J. E. DEERING & J. F. STEWARD.
SELF BINDING HARVESTER.
No. 509,020.   Patented Nov. 21, 1893.
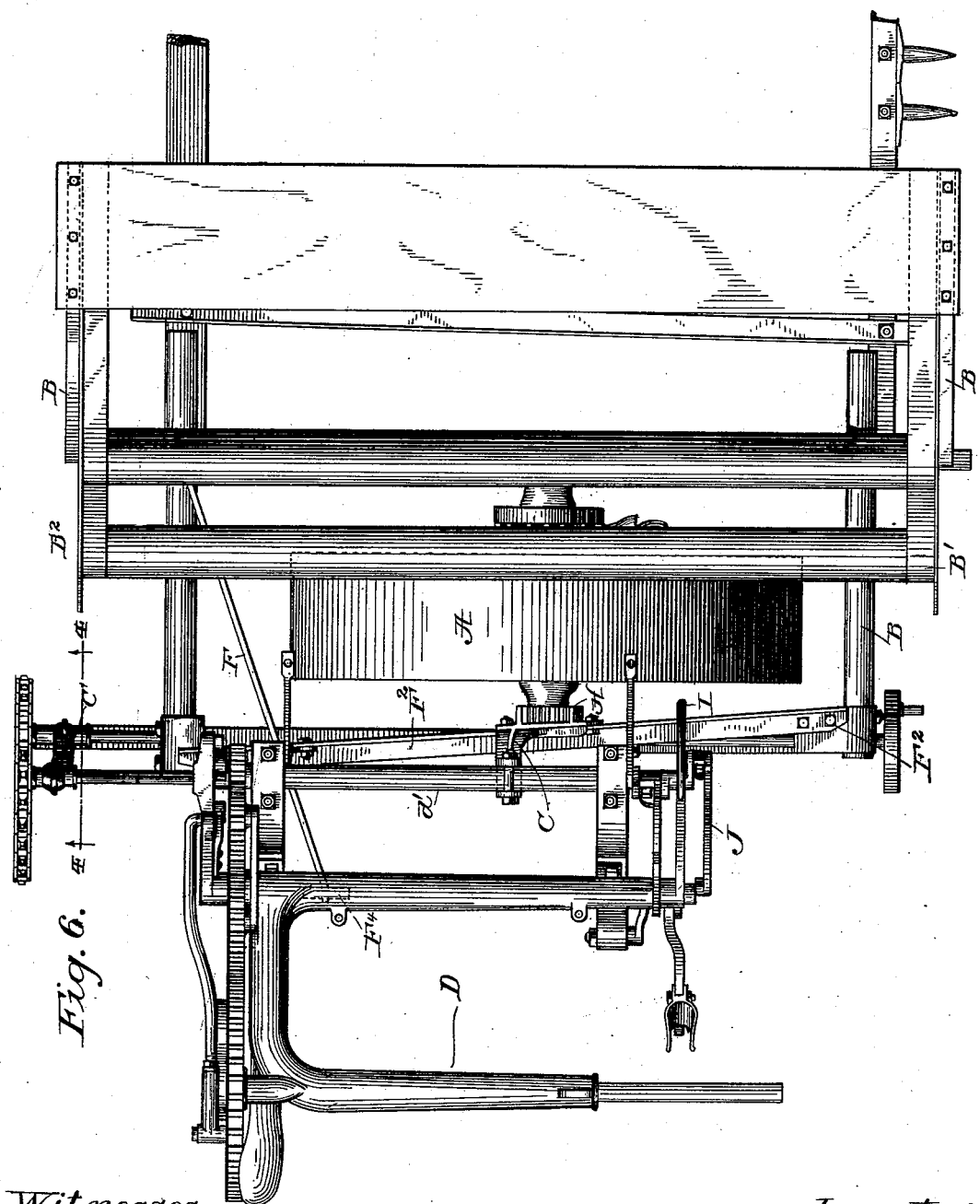
Witnesses.
Arthur Johnson
D. T. Gallatin
Inventors.
J. E. Deering
J. F. Steward
By Phil T. Dodge Atty

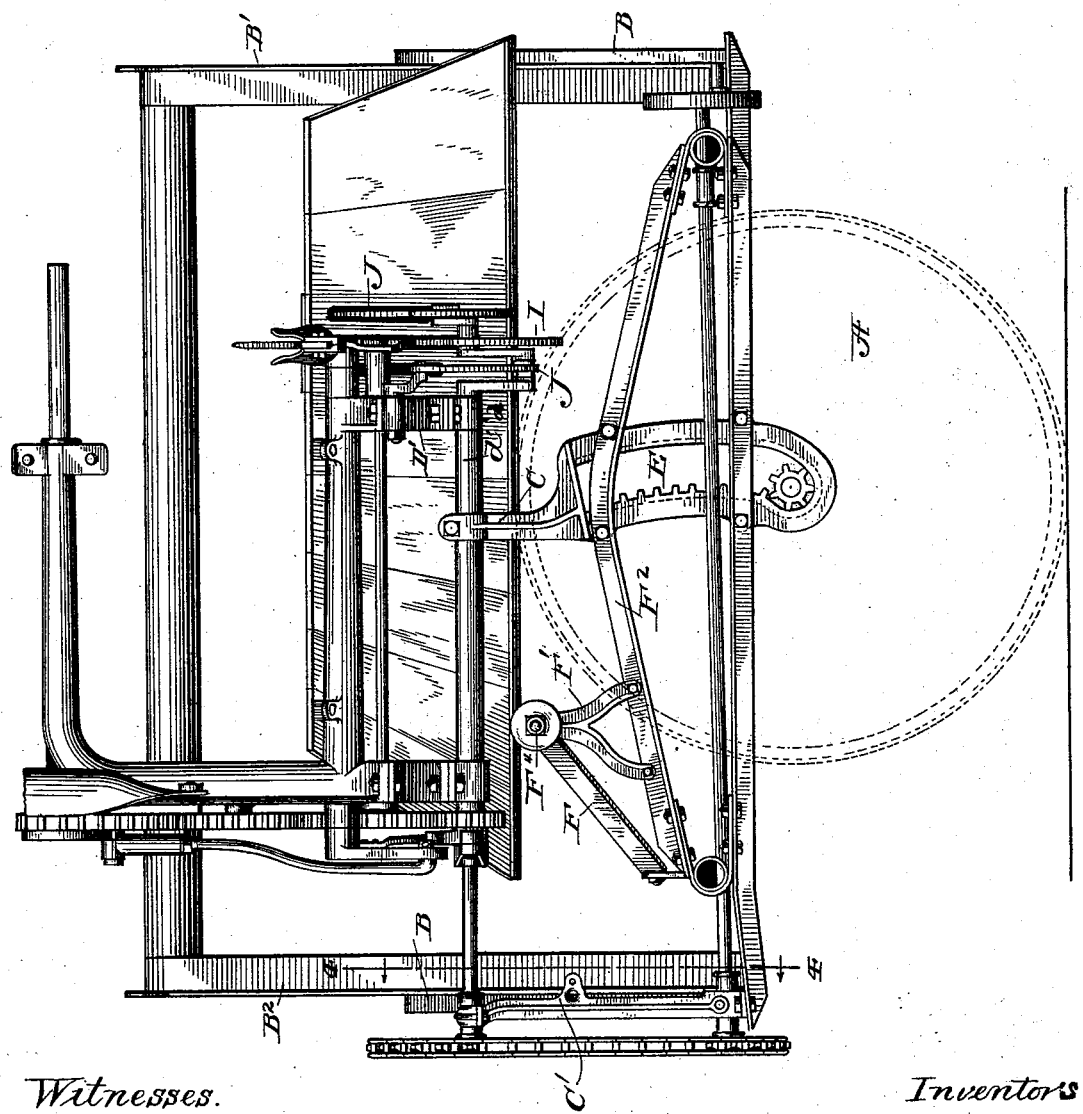

UNITED STATES PATENT OFFICE.

JAMES E. DEERING, OF EVANSTON, AND JOHN F. STEWARD, OF CHICAGO, ILLINOIS.

SELF-BINDING HARVESTER.

SPECIFICATION forming part of Letters Patent No. 509,020, dated November 21, 1893.

Application filed March 16, 1888. Serial No. 267,298. (No model.)

*To all whom it may concern:*

Be it known that we, JAMES E. DEERING, residing at Evanston, and JOHN F. STEWARD, residing at Chicago, in the county of Cook and State of Illinois, have invented certain new and useful Improvements in Self-Binding Harvesters, of which the following is a full description.

Our invention relates to harvesting and binding machines in which the entire binding mechanism including the deck or table as a whole may be folded over the wheel toward the harvester in order to reduce the width of the same for transportation or storing.

The object of this invention is to so construct and arrange certain parts of the machine that the folding operation will be very simple and can be readily accomplished without necessitating the disconnection of any of the parts. To this end we construct our binder in the usual manner with its deck in one rigid continuous length from the inner to the outer edge, and adapted to receive grain as usual directly from the elevator, but we modify the elevator in such manner as to leave an open unobstructed space beneath its overhanging end between it and the main wheel, and we connect our binder to the harvester by a horizontal axis upon which the same moves in a fore and aft direction so that when it is desired to fold the binder toward the harvester, the same is moved forward on the said axis and the receiving end of the rigid deck is thus permitted to pass down into the open space provided for the purpose between the side of the wheel and the elevator.

We are aware that binders have been heretofore pivoted and jointed in various ways to fold upward toward the harvesters on which they were mounted. When their decks are rigid and continuous they are so mounted that it is necessary to swing or lift them bodily to a higher elevation, or, on the other hand, necessary to hinge the top of the elevator that it may swing out of the way of the table. In other cases the table is constructed in two or more sections movable one in relation to the other to avoid interference with the elevator. Our machine is distinguishable from others in having a continuous rigid deck of the ordinary character adapted to receive the grain directly from the elevator, and in having the parts so organized that this rigid table may pass downward at the grain side of the wheel as the binder is folded.

By the expression a "rigid grain table" as employed in this specification and the claims is meant a table which is stiff or rigid from one edge to the other and which is adapted to receive the grain directly from the elevator.

Figure 2:
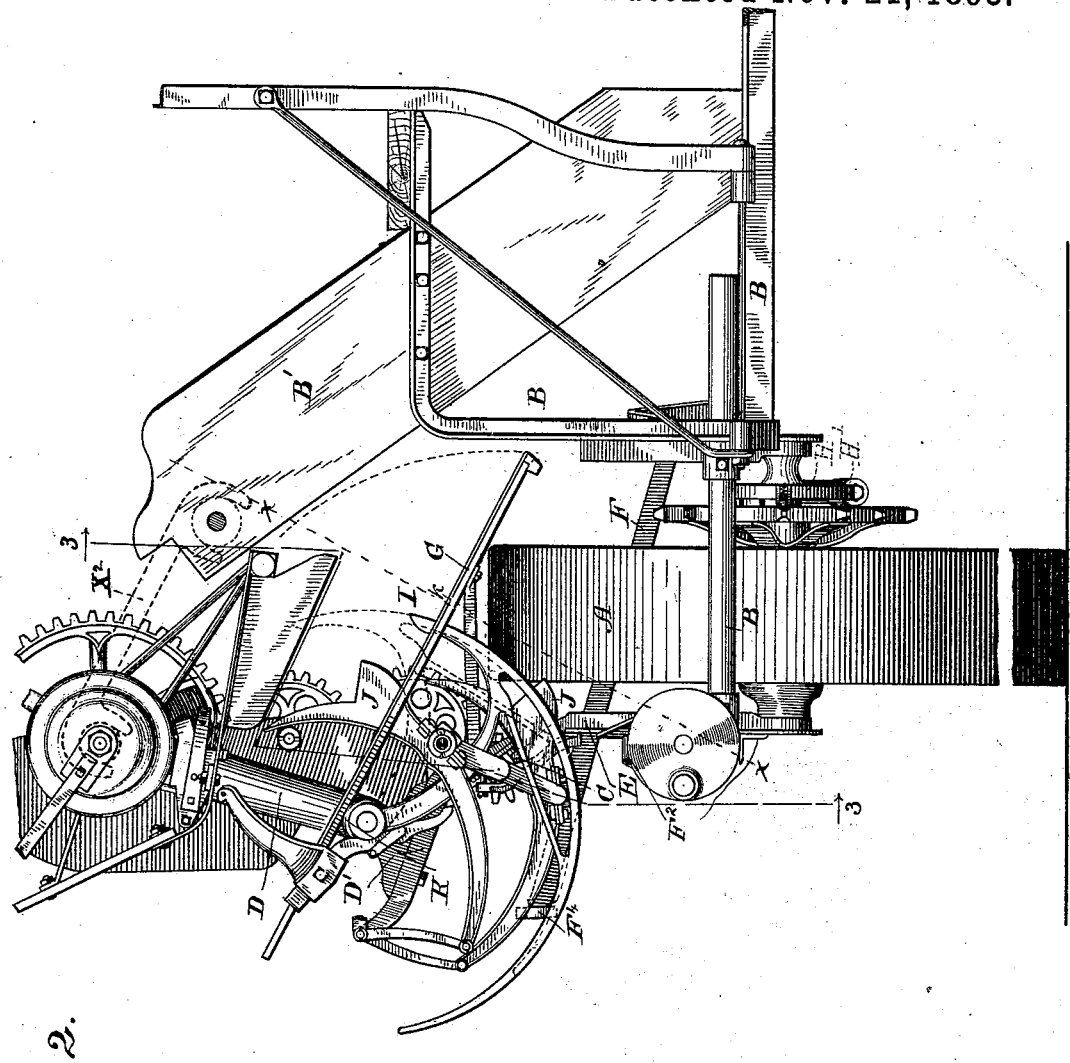
Figure 4:
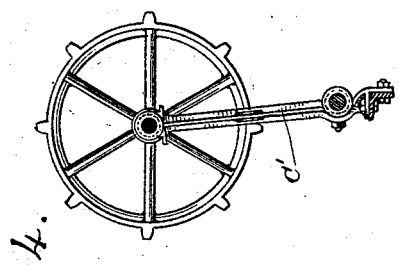

Figure 1 is a front elevation of our improvement, with the binding attachment in its operative position. Fig. 2 is an elevation showing the binding attachment folded. Fig. 3 is a sectional elevation on the line 3—3 in Fig. 2 looking in the direction of the arrows. Fig. 4 is a sectional elevation on the line 4—4 in Figs. 6 and 7 showing the rear binder-support and the sprocket wheel of the binder shaft. Fig. 5 is a sectional view on the line 5—5 in Fig. 3 showing the front deck support in elevation. Fig. 6 is a top plan view of the stubble end of a harvester-frame with the binder-frame in operative position thereon, the binder-deck and other parts being omitted. Fig. 7 is an elevation looking from the stubble side with the binder turned or folded grainward from the operative position.

In the drawings A, is the master wheel, and the parts B, B, B, B, are portions of the harvester frame. The parts B' and B² are the front and rear elevator frames respectively.

C, is the foremost support of the binder and C' the rearmost support thereof. These are adapted, as shown in Fig. 7, to support the binder frame, so that it may be folded upon the same axis as the packer shaft. In order that such may be the case the binder frame D, which from preference is of the usual U-shaped form, has upon the lower parallel of the frame two suitable lugs, D' and D².

D' is shown in detail in Fig. 5 while D² is only shown in section in Fig. 3, but as they are identical the rearmost one will be understood. To part D' we secure the packer shaft bearing $d$, and in this we pass the sleeve $d'$. This sleeve also enters the part of the frame D², as seen in Fig. 3. The packer shaft passes through this gas-pipe. The stubble side main wheel axle quadrant E, is extended upward and adapted to clasp the gas-pipe last described. The strut C' forms the rearmost binder support, being properly braced to the harvester frame. Upon its summit is mounted a packer shaft bearing. The packer shaft is journaled in this and adapted to slide fore and aft.

F, is an arm secured in the rear of, and to the grainward side of the master wheel, and supported by means of the bracket F' from the stubble side truss frame F² and having anti-friction roller F⁴ upon its extremity, as shown in Fig. 3, adapted to rest beneath the lowermost tubular part of the binder frame, as shown by dotted lines in Fig. 1.

So far as described, this arrangement is shown, described and claimed in the application of Joel H. Pitkin and John F. Steward, filed April 12, 1888, Serial No. 270,503, patented August 13, 1889, No. 409,063, wherein it will be found more in detail. We do not confine ourselves however, to any particular form of frame, but have adapted our binder to the one shown.

In order that our binder may be folded we provide means for elevating the machine somewhat higher, relative to the master wheel than is necessary for cutting grain, in order that we may take advantage of the space thus provided between the master wheel and the elevating devices and thus make room for the binder table, needle, packers and other parts located beneath the said binder table therein. Heretofore, as far as we are aware, it has been necessary to make the binder table in sections. That portion which is uppermost when in position for receiving grain, being adapted by means of hinges, or otherwise to fold, so that it can be swung upward to avoid contact with the master wheel. This difficulty we avoid by lowering the wheel relative to the binder.

As harvester frames have heretofore been constructed the binding attachment has been supported or sustained when folded from the upper portion of the frame work, as for instance, from the top of the elevator frame; this has brought so much strain upon the said frames that it was necessary to extend posts from the upper portion downward to the stubble side of the main frame, in position similar to that of the dotted line x, x, in Fig. 2.

It will be observed that our binder is mounted upon supports independent of the elevator frame. This is done in order to dispense with these posts, which we have referred to. We place the elevator frame supporting post B, so much grainward that the binding table G, shall clear it when the binding attachment is being folded from the position shown in Fig. 1, to that shown in Fig. 2, its arc of movement being shown by the dotted lines in Fig. 2. In order that the harvester frame may be elevated so high as to have sufficient recess beneath the elevator and over the master wheel, as stated, we have so provided that the wheel may be moved lower, and in order to so move it the wheel axle is provided with a raising and lowering device, preferably consisting of a worm wheel and the screw arrangement shown in Fig. 3, the worm wheel H, being keyed to the axle and the worm H' being supported upon a frame surrounding the axle and having the lugs h and h'.

The operation of folding the binder is as follows: The said binding attachment is moved forward to its farthest extent. The frame is then elevated to its highest position relative to the wheel. This operation or the reversal in the order of operation will bring the needle I, and the packers J, to the position shown in Figs. 2 and 3, namely some distance forward of the highest portion of the wheel, yet much lower than the highest portion thereof. Of course, if provision were not made for moving the binder far enough forward, these parts would all collide with the main supporting wheel, unless we adapted the wheel to pass much lower. We prefer, however, both movements, the placement of the elevator frames and the support B, relative to the axis upon which the binder is folded, and the upward extension of the deck being such in length that it may pass the parts B and B' of the elevator frame without coming in contact therewith. In order that the deck may move with the binder while folded we support it entirely upon the binder, by permitting it to rest upon the lowermost sleeve K, of the binder frame, and extending the bracket k, upward from the two portions D' and D² of the binder frame, as shown in Fig. 5, so as to properly control the upper extremity of said table. The upper or receiving end of the grain table stands when in operative position, in the usual relation to the elevator, near enough to receive the grain directly therefrom.

In Fig. 1, we have exaggerated somewhat the intermediate space in order to show more clearly the manner in which the table and the elevator are independently supported.

With the operative parts of the binder in their normal position of rest, and with the binder folded as in Fig. 2, it will be observed that the concentric extension of the needle extends some distance farther stubbleward than any other portion of the folded binder. This may be closed in by turning the working parts of the binder until the needle occupies the position shown in dotted lines in Fig. 2, when its end will be drawn in sufficiently far to clear anything beside which the binder may be passing,—as a tree or post,—that the other parts will clear.

When the binder is folded it may be maintained in position in any suitable manner, but we usually employ for the purpose a light bar, X², shown in dotted lines in Fig. 2, its ends which are formed with hooks or notches, being engaged one over one of the elevator rolls and the other over the upper arm of the binder-frame. The weight is carried mainly on the horizontal axle around which the binder folds. The bar X² is not claimed herein.

By reference to Fig. 3 it will be observed that the binder is moved much farther forward than the support F. This support, of course, is useless when the binder is folded. It is but necessary to lift the outer portion of the binder so high that no depending parts may strike the said support when the binder can be at the same time moved forward. An adjusting device by which the binder may be moved fore and aft for central binding from the driving seat may be used of any of the well known forms. When such is used it will be necessary to give it range so great that the binder may be moved forward enough to be folded without striking the wheel or disconnecting it entirely so that it may be moved forward by hand.

What we claim as our invention, and desire to secure by Letters Patent, is—

1. A harvester provided with the main wheel, in combination with a binder of the Appleby type, having a rigid grain table attached thereto, a horizontal axis connecting the binder and harvester and so located as to permit the binder to fold inward and project the edge of its table beyond the grain side of the wheel, and an elevator mounted on the harvester, its upper overhanging end arranged in position to deliver directly to the binder table, and its supports located grainward beyond the edge of the binder table when the latter is folded: the binding mechanism being movable in a fore and aft direction whereby the binder is permitted to fold without causing the binder-needle to strike the main wheel, and without having the table encounter the elevator supports.

2. In a harvester the main frame, the main wheel, and the elevator frame located and supported wholly on the grain side of the wheel to leave an open space between the two, in combination with the grain table, supported on an axis outside of the wheel, and movable in a fore-and-aft direction to and from a position partially beyond the elevator, and adapted, when in its forward position, to be folded in over the wheel into the open space between the latter and the elevator frame.

JAMES E. DEERING.
JOHN F. STEWARD.

Witnesses:
W. D. PORTER,
H. WOOD.